(12) United States Patent
Namgoong et al.

(10) Patent No.: US 11,677,605 B2
(45) Date of Patent: Jun. 13, 2023

(54) MACHINE LEARNING BASED UPLINK COVERAGE ENHANCEMENT USING PEAK REDUCTION TONES

(71) Applicant: QUALCOMM Incorporated, San Diego, CA (US)

(72) Inventors: June Namgoong, San Diego, CA (US); Krishna Kiran Mukkavilli, San Diego, CA (US); Taesang Yoo, San Diego, CA (US); Naga Bhushan, San Diego, CA (US); Tingfang Ji, San Diego, CA (US); Jay Kumar Sundararajan, San Diego, CA (US); Pavan Kumar Vitthaladevuni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 241 days.

(21) Appl. No.: 17/154,607

(22) Filed: Jan. 21, 2021

(65) Prior Publication Data

US 2021/0266210 A1     Aug. 26, 2021

Related U.S. Application Data

(60) Provisional application No. 63/009,369, filed on Apr. 13, 2020, provisional application No. 62/980,776, filed on Feb. 24, 2020.

(51) Int. Cl.
*H04L 27/26*     (2006.01)
*H04B 3/23*     (2006.01)
(Continued)

(52) U.S. Cl.
CPC ...... *H04L 27/2618* (2013.01); *G06F 18/2148* (2023.01); *G06N 3/045* (2023.01);
(Continued)

(58) Field of Classification Search
None
See application file for complete search history.

(56) References Cited

U.S. PATENT DOCUMENTS 10,084,632 B2    9/2018   Agon
10,153,933 B2   12/2018   Yang et al.
(Continued)

FOREIGN PATENT DOCUMENTS

CA            2763134 A1    12/2010
CA            2910352 A1    10/2014
(Continued)

OTHER PUBLICATIONS

International Search Report and Written Opinion—PCT/US2021/014600—ISA/EPO—dated May 7, 2021.
(Continued)

*Primary Examiner* — Phirin Sam
(74) *Attorney, Agent, or Firm* — Patterson + Sheridan, L.L.P.

(57) ABSTRACT

Certain aspects of the present disclosure provide techniques for generating and decoding orthogonal frequency division (OFDM) waveforms with peak reduction tones (PRTs) designed to reduce PAPR. By generating PRT tones with a machine learning (e.g., neural network) based encoder and mapping some of the PRT tones to subcarriers used for physical channels or signals, PAPR may be reduced while efficiently using system resources.

37 Claims, 14 Drawing Sheets

(51) Int. Cl.

| | |
|---|---|
| *G06N 3/08* | (2023.01) |
| *G06N 3/088* | (2023.01) |
| *H04L 5/00* | (2006.01) |
| *H04W 72/04* | (2023.01) |
| *G06F 18/214* | (2023.01) |
| *H04B 3/06* | (2006.01) |
| *H04B 3/46* | (2015.01) |
| *G06N 3/045* | (2023.01) |

(52) U.S. Cl.
CPC ............... *G06N 3/08* (2013.01); *G06N 3/088* (2013.01); *H04B 3/06* (2013.01); *H04B 3/238* (2013.01); *H04B 3/46* (2013.01); *H04L 5/0048* (2013.01); *H04L 27/2615* (2013.01); *H04W 72/04* (2013.01)

(56) References Cited

U.S. PATENT DOCUMENTS

| | | | |
|---|---|---|---|
| 10,177,951 B2 | 1/2019 | Oh et al. | |
| 10,305,553 B2 | 5/2019 | O'Shea et al. | |
| 10,531,415 B2 | 1/2020 | O'Shea et al. | |
| 2003/0040876 A1 | 2/2003 | Rao | |
| 2009/0141823 A1* | 6/2009 | Long | H04L 27/2618 375/260 |
| 2010/0008442 A1* | 1/2010 | Hellberg | H04L 27/2618 375/267 |
| 2010/0172438 A1 | 7/2010 | Koyanagi et al. | |
| 2012/0116756 A1 | 5/2012 | Kalinli | |
| 2013/0177089 A1 | 7/2013 | Al-Safadi et al. | |
| 2015/0146806 A1 | 5/2015 | Terry | |
| 2016/0365997 A1* | 12/2016 | Park | H04L 5/0007 |
| 2018/0083820 A1* | 3/2018 | Agon | H04L 43/0847 |
| 2019/0044792 A1* | 2/2019 | Kwon | H04W 52/42 |
| 2019/0274108 A1* | 9/2019 | O'Shea | G06N 3/0445 |
| 2019/0285742 A1* | 9/2019 | Wang | G01S 7/4004 |
| 2020/0412589 A1* | 12/2020 | Park | H04B 17/10 |
| 2021/0266036 A1 | 8/2021 | Namgoong et al. | |
| 2022/0263695 A1* | 8/2022 | Oh | H04L 5/001 |

FOREIGN PATENT DOCUMENTS

| | | |
|---|---|---|
| CN | 101192405 B | 5/2011 |
| RU | 2161826 C2 | 1/2001 |

OTHER PUBLICATIONS

Li L., et al., "Improved Tone Reservation Method Based on Deep Learning for PAPR Reduction in OFDM System", 2019, 11th International Conference on Wireless Communications and Signal Processing (WCSP), IEEE, Oct. 23, 2019 (Oct. 23, 2019),6 pages, XP033671896, DOI: 10.1109/WCSP.2019.8928103 [retrieved on Dec. 6, 2019] Sections II. and III. figure 1, p. 1, right-hand col., p. 2, right-hand col.—p. 3,left-hand col., paragraph [IIIC].

Mizutani K., et al., "A Papr Reduction of OFDM Signal Using Neural Networks with Tone Injection Scheme", 2007 6th International Conference on Information, Communications & Signal Processing; Singapore; Dec. 10-13, 2007, IEEE, Piscataway, NJ, USA, Dec. 10, 2007 (Dec. 10, 2007), 5 pages, XP031229663, ISBN: 978-1-4244-0982-2, The whole document.

Ohta M., et al., "Complexity Suppression of Neural Networks for PAPA Reduction of OFDM Signal", IEICE Transactions on Fundamentals of Electronics, Communications and Computer Sciences, Engineering Sciences Society, Tokyo, JP, vol. E93A, No. 9, Sep. 1, 2010 (Sep. 1, 2010), pp. 1704-1708, XP001558593, ISSN: 0916-8508, DOI: 10.1587/TRANSFUN.E93.A.1704, paragraph [0003].

Ohta M., et al., "PAPR Reduction of OFDM Signal by Neural Networks without Side Information and its FPGA Implementation", Electronics and Communications in Japan, Scripta Technica, New York, US, vol. 91, No. 4, Apr. 1, 2008 (Apr. 1, 2008), pp. 52-60, XP001523147, DOI: 10.1002/ECJ.10081, Sections 2. and 3. figures 6,7, paragraph [02.3]—paragraph [02.4].

Tellado-Mourelo J., "Peak to Average Power Reduction for Multicarrier Modulation", A Dissertation Submitted to the Department of Electrical Engineering and the Committee on Graduate Studies of Stanford University in Partial Fulfillment of the Requirements for the Degree of Doctor of Philosophy, XX, XX, Sep. 1, 1999, (Sep. 1, 1999), XP002463333, 169 pages, figure 3.18, paragraph [03.9], p. 66—p. 99, figure 4.1, p. 100—p. 122, figure 5.1.

ZTE: "PAPR Reduction for OFDMA Using Improved Tone Reservation with Low Complexity," 3GPP Draft, R1-050836 PAPR Reduction for OFDMA Using Improved Tone Reservation with Low Complexity, 3rd Generation Partnership Project (3GPP), Mobile Competence Centre; 650, Route Des Lucioles; F-06921, Sophia-Antipolis Cedex; France, Aug. 25, 2005 (Aug. 25, 2005). XP050595992, 14 pages, [retrieved on Aug. 25, 2005] the whole document.

Pantosd., et al., "Peak-to-Average Power Ratio Reduction of OFDM Signals Using EvolutionaryTechniques", Journal of Communications and Networks, New York, NY, USA, IEEE,US, vol. 10, No. 3, Sep. 1, 2008 (Sep. 1, 2008), pp. 233-238, XP011483520, ISSN: 1229-2370, DOI: 10.11 09/JCN.2008.6388344, p. 235, Left-hand column.

* cited by examiner

MACHINE LEARNING BASED UPLINK COVERAGE ENHANCEMENT USING PEAK REDUCTION TONES

PRIORITY CLAIM(S)

This application claims benefit of the priority to U.S. Provisional Application No. 62/980,776 filed on Feb. 24, 2020, and U.S. Provisional Application No. 63/009,369, filed on Apr. 13, 2020, both of which are expressly incorporated by reference in their entirety as if fully set forth below and for all applicable purposes.

INTRODUCTION

Aspects of the present disclosure relate to wireless communications, and more particularly, to techniques for enhancing encoding schemes that use peak reduction tones (PRTs).

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include ability to generate an orthogonal frequency division (OFDM) waveform with reduced peak to average power ratio (PAPR) using peak reduction tones sent on data subcarriers.

Certain aspects of the subject matter described in this disclosure can be implemented in a method for wireless communication by a transmitter. The method generally includes generating, with an encoder neural network, a first set of peak reduction tones (PRTs) and a second set of PRTs, and sending, to a receiver, an OFDM waveform with the first set of PRTs on a first set of subcarriers with at least one of physical channels or reference signals and the second set of PRTs on a second set of subcarriers without the physical channels or reference signals.

Certain aspects of the subject matter described in this disclosure can be implemented in a method for wireless communication by a receiver. The method generally includes receiving, from a transmitter, an OFDM waveform generated with an encoder neural network that maps a set of tones to a first set of PRTs on a first set of subcarriers with at least one of physical channels or reference signals and a second set of PRTs on a second set of subcarriers without the physical channels or reference signals, and decoding the OFDM waveform using a decoder neural network.

Certain aspects of the subject matter described in this disclosure can be implemented in a method for wireless communication by a transmitter. The method generally includes generating, with a machine learning (ML) based encoder, a first set of PRTs and a second set of PRTs and, sending, to a receiver, an OFDM waveform with the first set of PRTs on a first set of subcarriers with at least one of physical channels or reference signals and the second set of PRTs on a second set of subcarriers without the physical channels or reference signals.

Certain aspects of the present disclosure are directed to an apparatus for wireless communication by a transmitter. The apparatus generally includes a memory and at least one processor coupled to the memory, the memory and the at least one processor being configured to generate, with a ML based encoder, a first set of PRTs and a second set of PRTs and, send, to a receiver, an OFDM waveform with the first set of PRTs on a first set of subcarriers with at least one of physical channels or reference signals and the second set of PRTs on a second set of subcarriers without the physical channels or reference signals.

Certain aspects of the present disclosure are directed to an apparatus for wireless communication by a transmitter. The apparatus generally includes means for generating, with a ML based encoder, a first set of PRTs and a second set of PRTs and, means for sending, to a receiver, an OFDM waveform with the first set of PRTs on a first set of subcarriers with at least one of physical channels or reference signals and the second set of PRTs on a second set of subcarriers without the physical channels or reference signals.

Certain aspects of the present disclosure are directed to a computer readable medium having instructions stored thereon for generating, with a ML based encoder, a first set of PRTs and a second set of PRTs and, sending, to a receiver, an OFDM waveform with the first set of PRTs on a first set of subcarriers with at least one of physical channels or reference signals and the second set of PRTs on a second set of subcarriers without the physical channels or reference signals.

Certain aspects of the subject matter described in this disclosure can be implemented in a method for wireless communication by a receiver. The method generally includes receiving, from a transmitter, an OFDM waveform generated with a ML based encoder that maps a set of tones to a first set of PRTs on a first set of subcarriers with at least one of physical channels or reference signals and a second set of PRTs on a second set of subcarriers without the physical channels or reference signals, and decoding the OFDM waveform using an ML based decoder.

Certain aspects of the present disclosure are directed to an apparatus for wireless communication by a receiver. The apparatus generally includes a memory and at least one processor coupled to the memory, the memory and the at least one processor being configured to receive, from a transmitter, an OFDM waveform generated with a ML based encoder that maps a set of tones to a first set of PRTs on a first set of subcarriers with at least one of physical channels or reference signals and a second set of PRTs on a second set of subcarriers without the physical channels or reference signals, and decode the OFDM waveform using an ML based decoder.

Certain aspects of the present disclosure are directed to an apparatus for wireless communication by a receiver. The apparatus generally includes means for receiving, from a transmitter, an OFDM waveform generated with a ML based encoder that maps a set of tones to a first set of PRTs on a first set of subcarriers with at least one of physical channels or reference signals and a second set of PRTs on a second set of subcarriers without the physical channels or reference signals, and means for decoding the OFDM waveform using an ML based decoder.

Certain aspects of the present disclosure are directed to a computer readable medium having instructions stored thereon for receiving, from a transmitter, an OFDM waveform generated with a ML based encoder that maps a set of tones to a first set of PRTs on a first set of subcarriers with at least one of physical channels or reference signals and a second set of PRTs on a second set of subcarriers without the physical channels or reference signals and decoding the OFDM waveform using an ML based decoder.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
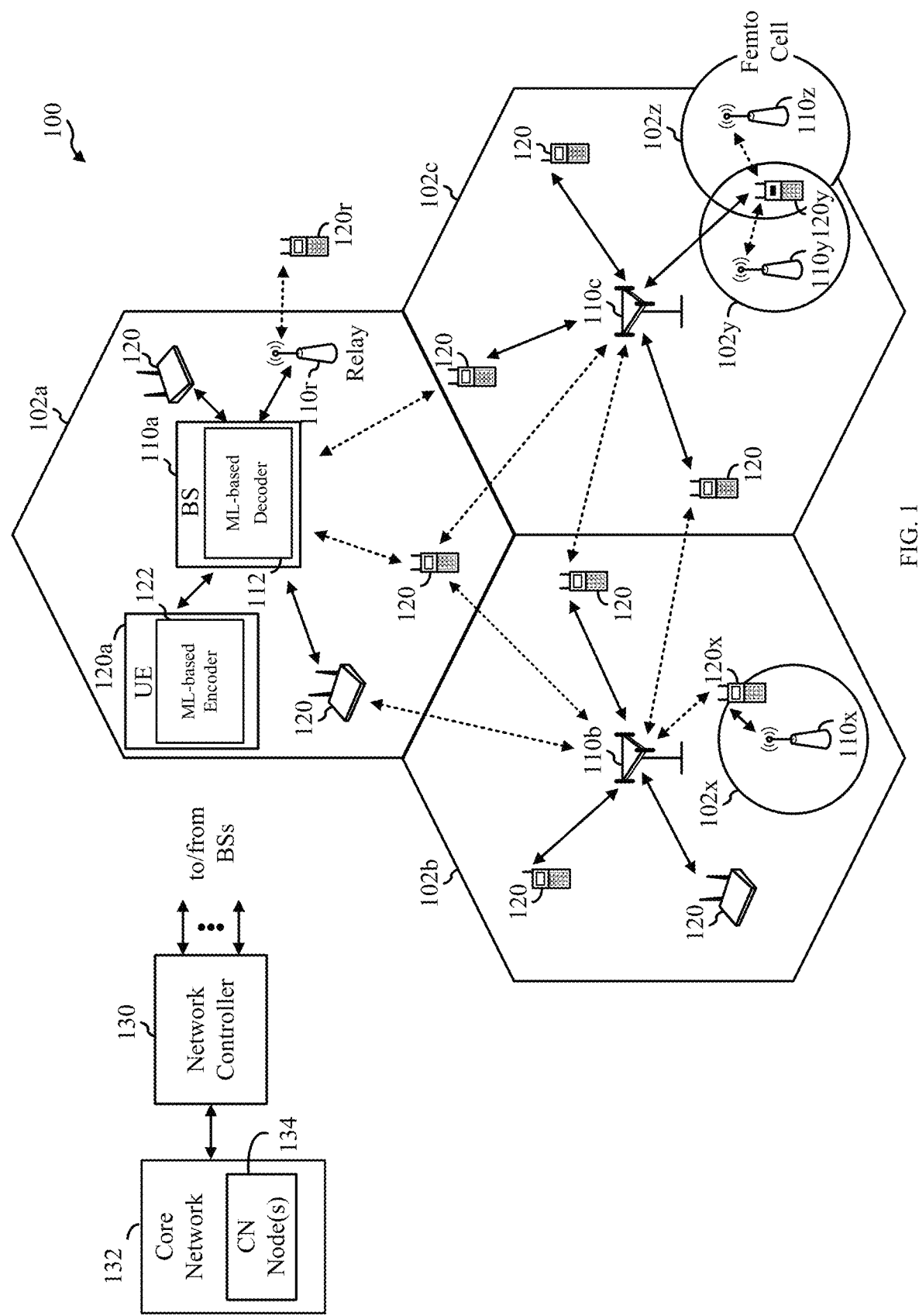
FIG. 1 is a block diagram conceptually illustrating an example wireless communication network, in accordance with certain aspects of the present disclosure.

Aspects of the present disclosure provide apparatus, methods, processing systems, and computer readable mediums for generating and decoding orthogonal frequency division (OFDM) waveforms with peak reduction tones (PRTs) designed to reduce PAPR. By generating PRT tones with a machine learning (e.g., neural network) based encoder and mapping some of the PRT tones to subcarriers used for physical channels or signals, PAPR may be reduced while efficiently using system resources.

The following description provides examples of generating and decoding OFDM waveforms with PRTs designed to reduce PAPR, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, a UE 120 of the wireless communication network 100 may be configured with an ML-based encoder 122 configured to perform (or assist UE 120 in performing) operations 700 of FIG. 7 and/or operations 1000 of FIG. 10 to generate OFDM waveforms with PRTs mapped to data subcarriers. Similarly, a base station (BS) 110 of the wireless communication network 100 may be configured with an ML-based decoder 112 configured to perform (or assist BS 110 in performing) operations 800 of FIG. 8 and/or operations 1100 of FIG. 11 to process such an OFDM waveform generated by a UE 120.

The wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

Figure 2:
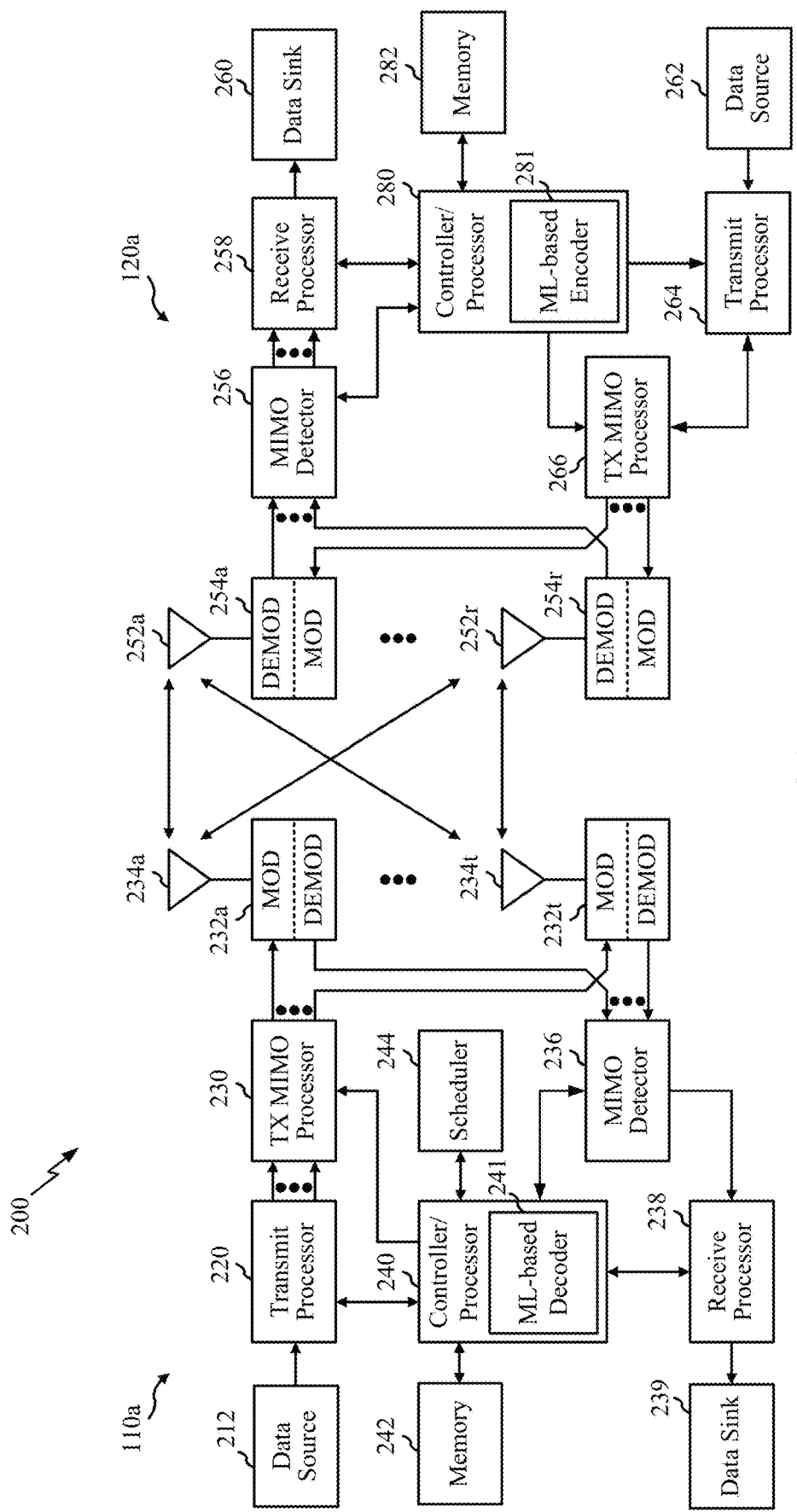
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a*-232*t*. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232*a*-232*t* may be transmitted via the antennas 234*a*-234*t*, respectively.

At the UE 120*a*, the antennas 252*a*-252*r* may receive the downlink signals from the BS 110*a* and may provide received signals to the demodulators (DEMODs) in transceivers 254*a*-254*r*, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254*a*-254*r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink, at UE 120*a*, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM, etc.), and transmitted to the BS 110*a*. At the BS 110*a*, the uplink signals from the UE 120*a* may be received by the antennas 234, processed by the demodulators 232, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

Antennas 252, processors 266, 258, 264, and/or controller/processor 280 of the UE 120*a* and/or antennas 234, processors 220, 230, 238, and/or controller/processor 240 of the BS 110*a* may be used to perform the various techniques and methods described herein. For example, as shown in FIG. 2, the controller/processor 240 of the BS 110*a* has an ML based decoder 241 and the controller/processor 280 of the UE 120*a* has an ML based encoder 281. The ML based decoder 241 may be configured to perform operations 700 of FIG. 7 or operations 1000 of FIG. 10 and/or the ML based encoder 281 may be configured to perform operations 800 of FIG. 8 or operations 1100 of FIG. 11. Although shown at the controller/processor, other components of the UE 120*a* and BS 110*a* may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
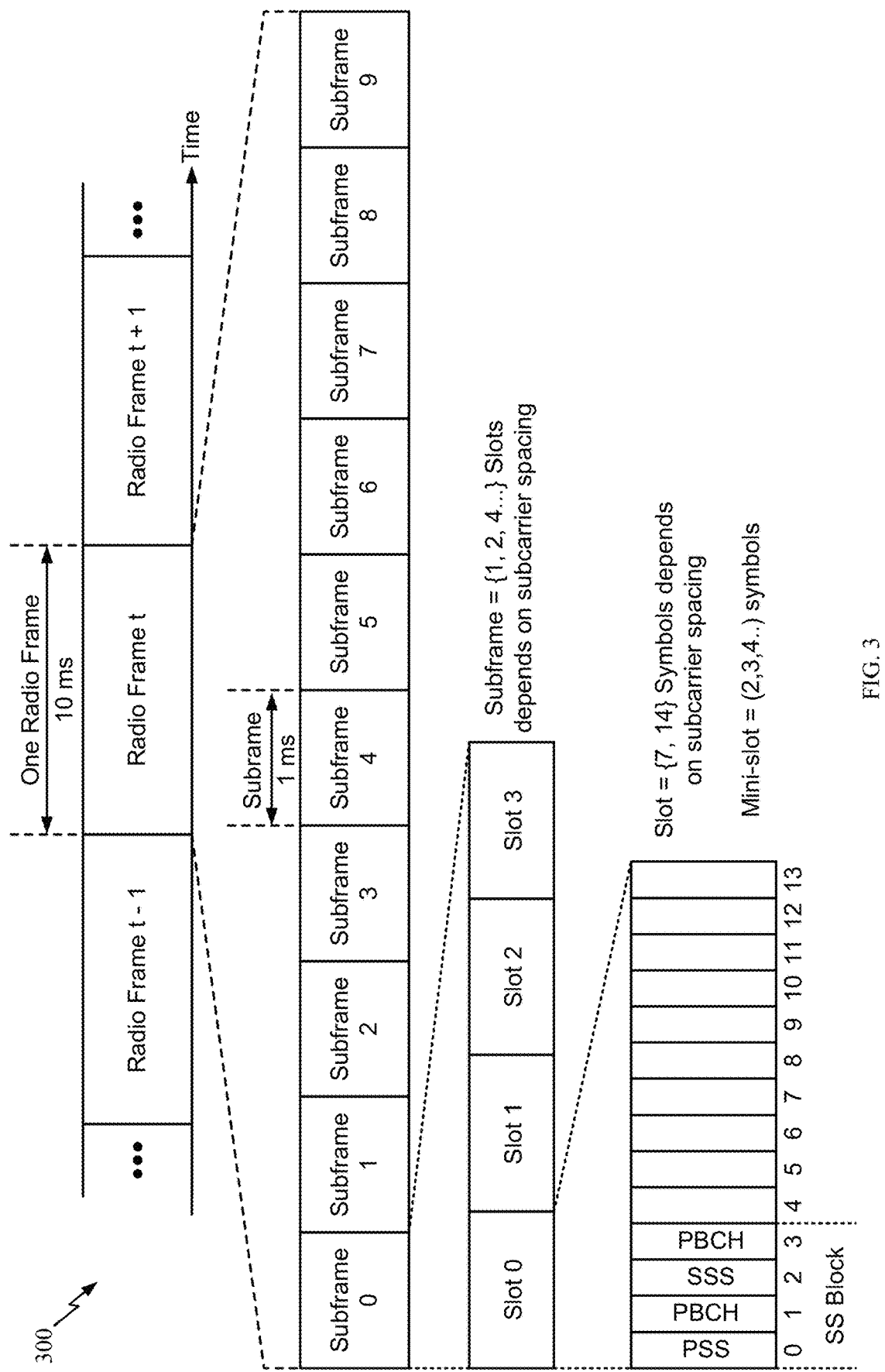
FIG. 3 is an example frame format for communication in a wireless communication network, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Example ML Based UL Coverage Enhancement Using PRTs

The conventional orthogonal frequency division multiplexing (OFDM) waveform adopted in the NR specification generally suffers from a relatively large peak-to-average power ration (PAPR), which subsequently necessitates a large amount of power amplifier (PA) back-off, at the cost of the degraded PA efficiency. A mechanism known as a tone reservation scheme can be used to reduce the PAPR.

Figure 4:
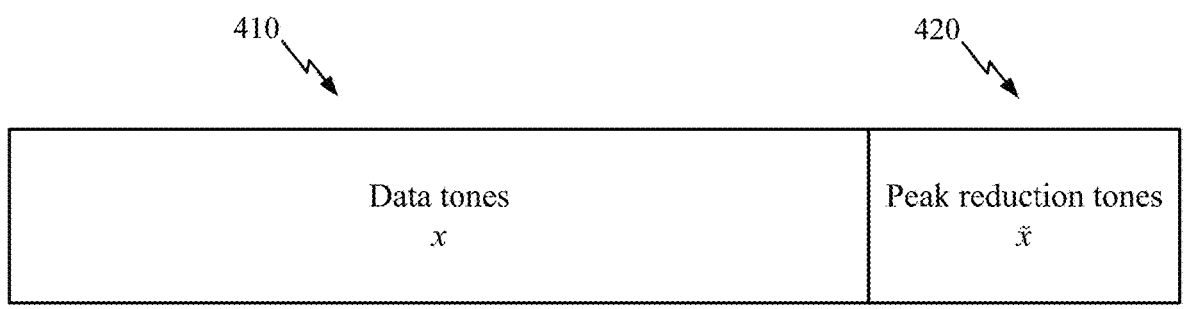
FIG. 4 illustrates an example allocation of data tones and peak reduction tones (PRTs), in accordance with certain aspects of the present disclosure.

As illustrated in FIG. 4, according to a conventional tone reservation scheme, given a set of desired (or useful) tones to be transmitted (e.g., data tones x), a dedicated set of additional tones ($\tilde{x}$) orthogonal to the useful tones are used to shape the time domain signal. These additional tones are referred to as peak reduction tones (PRTs). The PRTs are used to shape the time domain signal by clipping (e.g., limiting) the peaky part of the original OFDM waveform. The error vector magnitude (EVM) of the data tones can be protected, without the receiver having to know exactly what is transmitted on the sub carriers for PRT. In practice, the peak power is reduced, but at the cost of the increased average transmit power, if the EVM is maintained for the data tones.

In a conventional approach, the PRTs are computed for a given input by running an iterative algorithm by introducing PRTs. In other words, there is no known relation between the data tones and the PRTs, and the mapping between the desired tones and PRTs is arbitrary. Further, in the conventional tone reservation scheme, the PRTs are of relatively low utility as far as the receiver is concerned. As a result, PRTs are pure overhead in the conventional tone reservation scheme, as they are sent on subcarriers that are not used for transmitting otherwise meaningful data (e.g., physical channels or other signals).

According to certain aspects of the present disclosure, however, a machine learning (ML) based encoder of a transmitter may be trained to learn the relationships between data tones and PRTs. As will be described in greater detail, an ML-based encoder may generate two sets of PRT tones. One set of the PRT tones may be sent on subcarriers with the data (e.g., physical channels or signals), while the other set of PRTs may sent on subcarriers without the data. This relationship between the data tones and PRTs can be used by a receiver to improve the demodulation performance, since the PRTs contain the information about the data tones.

As will be described in greater detail below, ML (e.g., using a neural network) can be used to determine a function mapping between the desired tones and the PRTs, as opposed to the conventional approach where the mapping between the desired tones and PRTs is arbitrary. In other words, in the ML-based tone reservation approach described herein, a known function can map the desired tones to the PRTs. This known function (e.g., a known relationship) can be used by the receiver to improve the demodulation performance, since the PRTs contain the information about the data tones.

Figure 5:
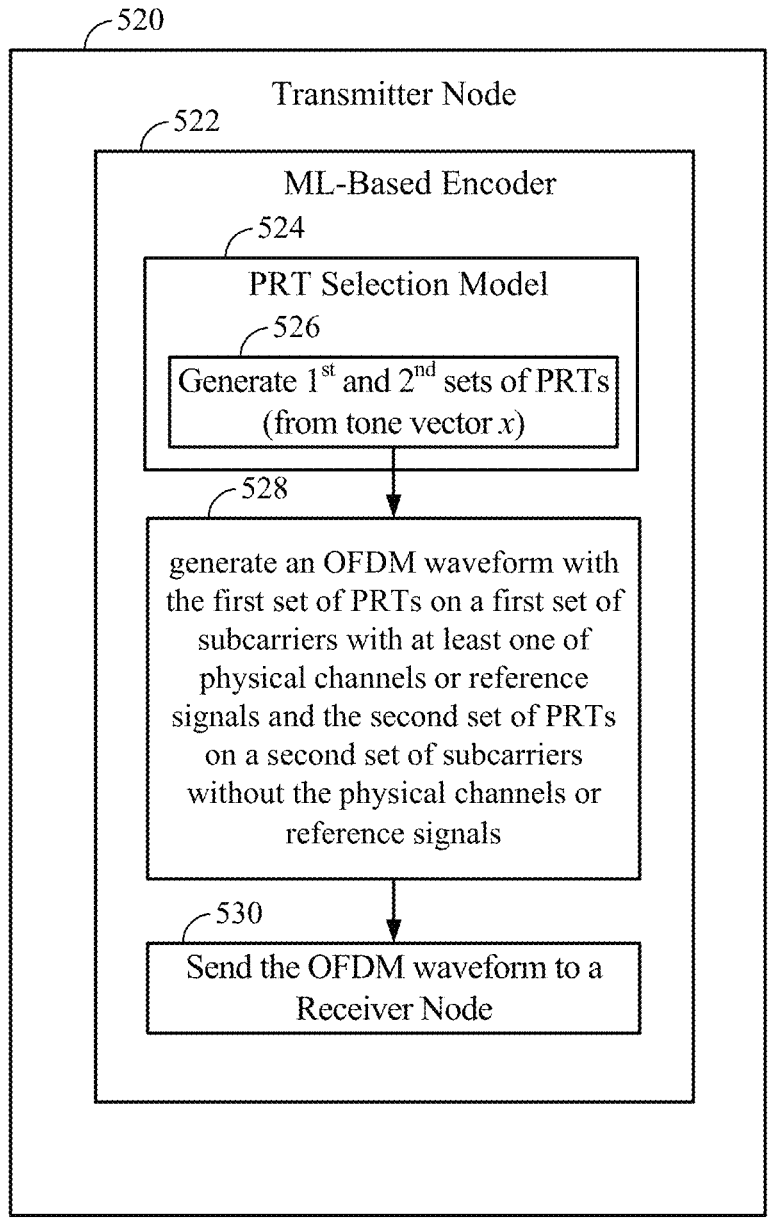
FIG. 5 illustrates an example transmitter node with a machine learning (ML) based encoder, according with certain aspects of the present disclosure.

As shown in FIG. 5, a transmitter node 520 (e.g., such as a UE 120 of FIG. 1 or FIG. 2) may include an ML-based encoder 522. The ML-based encoder 522 may include a PRT selection model 524 configured to generate first and second sets of PRTs from a tone vector x. As will be described in greater detail below, the ML-based encoder 522 (and/or PRT selection model 524) may be trained at either the transmitter node 520 or a receiver node. In this case, the learned information, such as neural network weights, may be sent to the transmitter node 520.

As illustrated, the ML-based encoder may generate, at 528, an OFDM waveform with the first set of PRTs on a first set of subcarriers with at least one of physical channels or reference signals and the second set of PRTs on a second set of subcarriers without the physical channels or reference signals. The OFDM waveform may be transmitted, at 530, to a receiver, such as receiver node 620 of FIG. 6.

Figure 6:
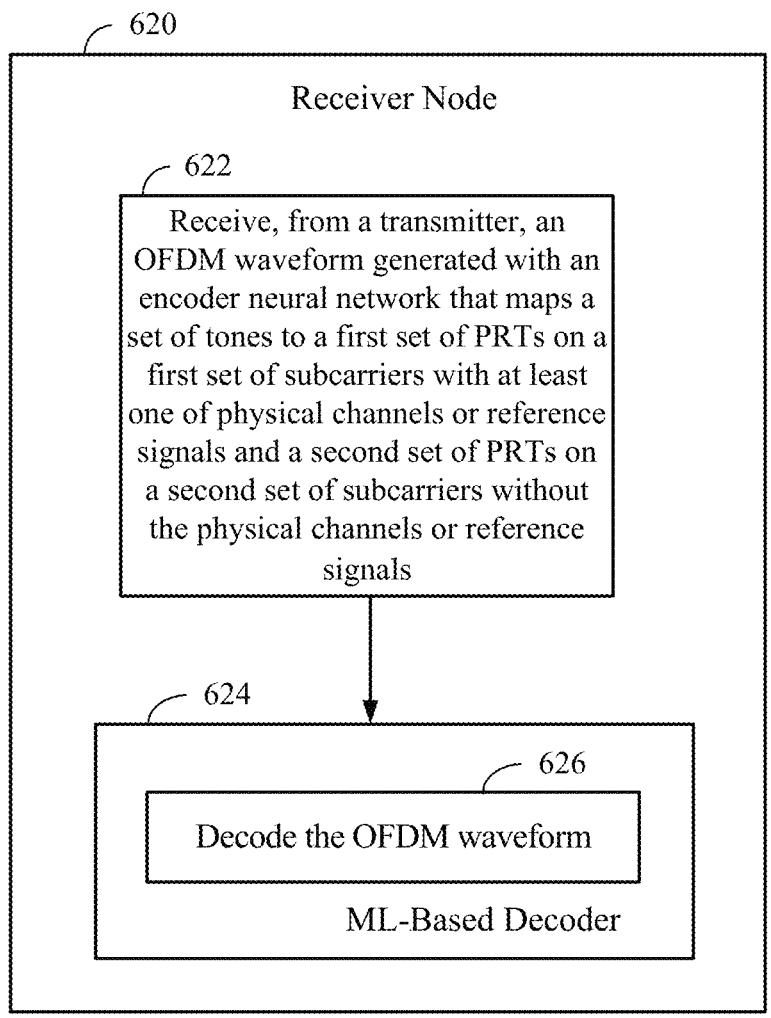
FIG. 6 illustrates an example receiver node with an ML based decoder, according with certain aspects of the present disclosure.

As shown in FIG. 6, the receiver node 620 (e.g., such as a BS 110 of FIG. 1 or FIG. 2) may receive the OFDM waveform (generated by transmitter node 520) and process the OFDM waveform with an ML-based decoder 624. The ML-based decoder 624 may decode the OFDM waveform 626, for example, with knowledge of the relationship used by the PRT selection model 524 of transmitter node 520 to generate first and second sets of PRTs from a tone vector x. In some cases, the ML-based decoder may be trained at either the receiver node 620 or the transmitter node. In this case, the learned information, such as neural network weights, may be sent to the receiver node 620.

Figure 7:
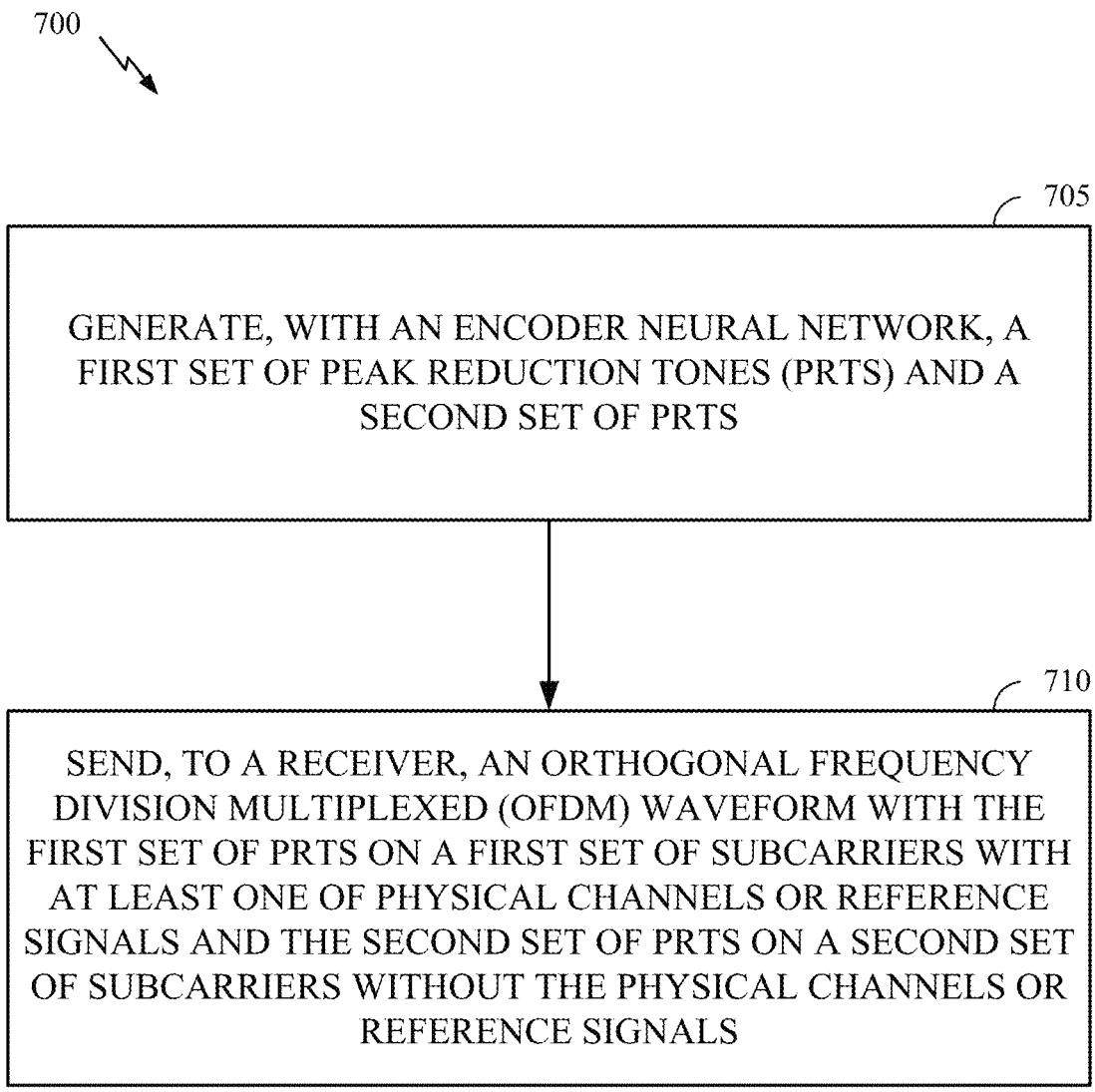
FIG. 7 illustrates example operations for wireless communication by a transmitter, in accordance with certain aspects of the present disclosure.

FIG. 7 illustrates example operations 700 for wireless communication by a transmitter, in accordance with certain aspects of the present disclosure. The operations 700 may be performed, for example, by a transmitter node 520 of FIG. 5, such as a UE (e.g., UE 120a in the wireless communication network 100). When the transmitter is a UE, operations 700 may be implemented as software components that are executed and run on one or more processors (e.g., controller/processor 280 of FIG. 2). Further, the transmission of signals by the UE in operations 700 may be enabled, for example, by one or more antennas (e.g., antennas 252 of FIG. 2). In certain aspects, the transmission of signals by the UE may be implemented via a bus interface of one or more processors (e.g., controller/processor 280) obtaining and/or outputting signals.

Operations 700 begin, at 702, by generating, with an encoder neural network, a first set of peak reduction tones (PRTs) and a second set of PRTs. As will be described in greater detail below, an encoder neural network is just one type of ML-based encoder that may be used. At 704, the transmitter sends, to a receiver, an orthogonal frequency division multiplexed (OFDM) waveform with the first set of PRTs on a first set of subcarriers with at least one of physical channels or reference signals and the second set of PRTs on a second set of subcarriers without the physical channels or reference signals.

Figure 8:
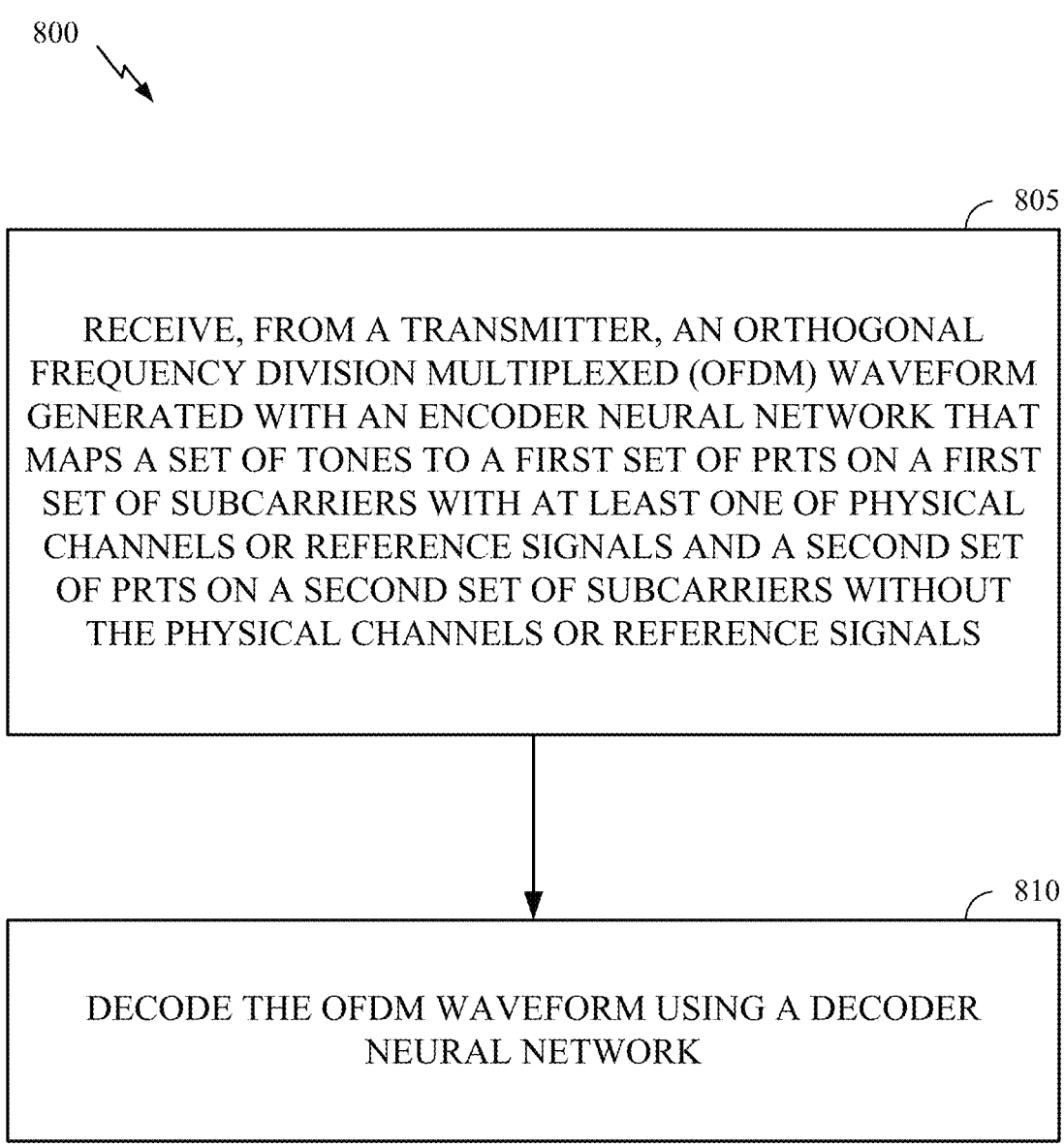
FIG. 8 illustrates example operations for wireless communication by a receiver, in accordance with certain aspects of the present disclosure.

FIG. 8 illustrates example operations 800 for wireless communication by a receiver, in accordance with certain aspects of the present disclosure. The operations 800 may be performed, for example, by a receiver node 620 of FIG. 6, such as a base station (e.g., BS 110 in the wireless communication network 100). When the receiver is a BS, operations 800 may be implemented as software components that are executed and run on one or more processors (e.g., controller/processor 240 of FIG. 2). Further, the reception of signals the BS in operations 800 may be enabled, for example, by one or more antennas (e.g., antennas 234 of FIG. 2). In certain aspects, the reception of signals by the BS may be implemented via a bus interface of one or more processors (e.g., controller/processor 240) obtaining and/or outputting signals Operations 800 begin, at 802, by receiving, from a transmitter, an orthogonal frequency division multiplexed (OFDM) waveform generated with an encoder neural network that maps a set of tones to a first set of PRTs on a first set of subcarriers with at least one of physical channels or reference signals and a second set of PRTs on a second set of subcarriers without the physical channels or reference signals. At 804, the receiver decodes the OFDM waveform using a decoder neural network. As will be described in greater detail below, a decoder neural network is just one type of ML-based decoder that may be used.

Figure 9:
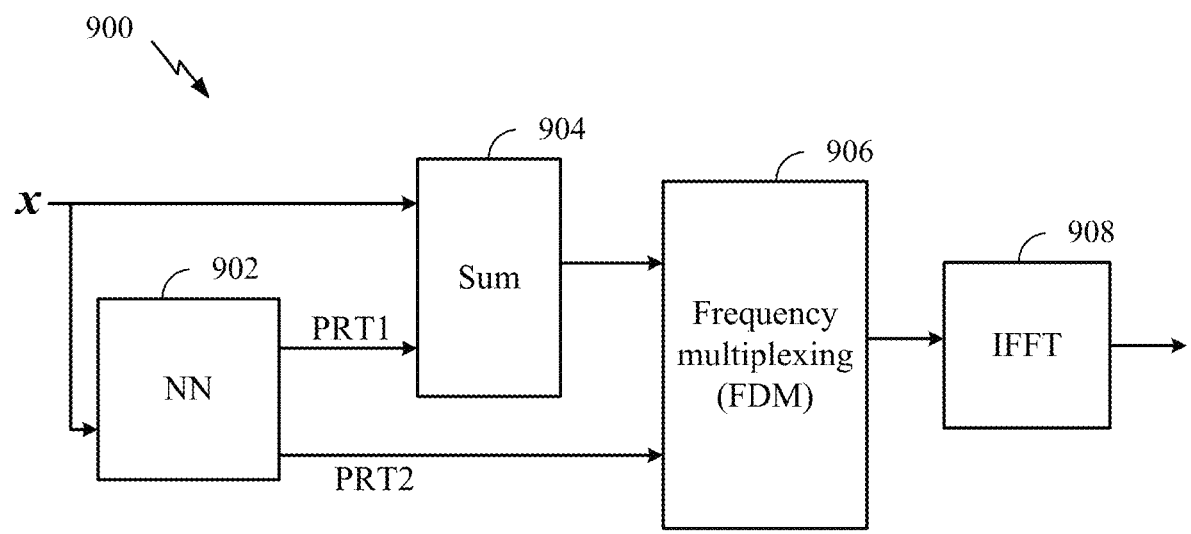
FIG. 9 illustrates a block diagram of an example neural network based encoder, in accordance with certain aspects of the present disclosure.

FIG. 9 illustrates an example of a transmitter node 900 configured to generate an OFDM signal in accordance with operations 700 of FIG. 7. As illustrated, the transmitter node 900 has an encoder neural network (NN) 902 (e.g., a ML-based encoder) that generates two sets of PRTs (PRT1 and PRT2) from a tone vector x. The number of tones in the vector x and, in turn, a mapping function used for generating PRT1 and PRT2 may depend on the operating bandwidth (e.g., the number of resource blocks allocated for the uplink transmission).

As illustrated, some of the PRT tones are sent on the subcarriers with the data (e.g., by combining PRT1 with data tones via a summer 904), while the rest of the PRTs are sent on the subcarriers without the data. The combined tones PRT1 and data tones are combined with PRT2 via frequency division multiplexer 906, the output of which is provided to an inverse fast Fourier transform (IFFT) module 908 that takes the frequency-domain input data and converts it to the time-domain output data, resulting in the OFDM symbol waveform.

In a conventional tone reservation scheme, the PRT resource consists of subcarriers that are orthogonal to the frequency resource (e.g., data tones) used for the regular uplink (UL) physical layer (PHY) channels, such as physical uplink shared channel (PUSCH), or other signals such as UL demodulation reference signals (DMRS). The additional PRT resources used in the techniques proposed herein, however, results in more degrees of freedom for the UE to shape the time domain kernel used in the peak reduction algorithms. Therefore, better PAPR reduction can be achieved by allocating some of the resource already assigned for transmission of the other UL PHY channels/signal s.

With some of the frequency resource allocated to both PRT and the UL PHY channels/signals, the EVM of those UL PHY channels/signals may degrade, due to the inference caused by PRT. Depending on the signal-to-interference-plus-noise ratio (SINR) of the frequency resource, such as resource blocks (RBs) and the target modulation and coding scheme (MCS), the EVM degradation due to PRT may be negligible. In such cases, it may be beneficial to assign the frequency resource to both PRT and UL PHY channels/signals, as proposed herein. In the RBs with relatively good channel conditions (e.g., high SINR), larger interference from PRTs may be tolerable.

On the receiver side, a decoder NN (or other ML-based decoder) may be trained (or configured) to help with demodulation of the data tones. In other words, the decoder NN may help recover the EVM of the data tones that collide with PRT by using the PRT tones. Using this PRT tone aided demodulation, the decoder can use the relation between the data and the first set of PRT tones (e.g., PRT1) embedded in the received data tones, and the second set of tones (e.g., PRT2), as the decoder may have knowledge of the mapping function used by the encoder NN to generate PRT1 and PRT2.

There are generally two approaches for configuring the ML based encoder and/or decoder (e.g., signaling weights used to configure the PRT selection at the encoder or informing the decoder of the corresponding mapping function). A first approach may be considered as transmitter driven (e.g., at the UE). In this case, the transmitter finds the encoder and the decoder parameters/weights (e.g., per the training described below) and signals the decoder settings to the receiver (e.g., a BS/gNB). A second approach may be considered as receiver driven (e.g. by a BS/gNB). In this case, the receiver finds the encoder and the decoder parameters/settings, and signals the encoder settings to the transmitter.

As noted above, while neural networks are used as examples, more generally, any type of ML-based encoders and decoders could be used to perform the techniques proposed herein.

Figure 10:
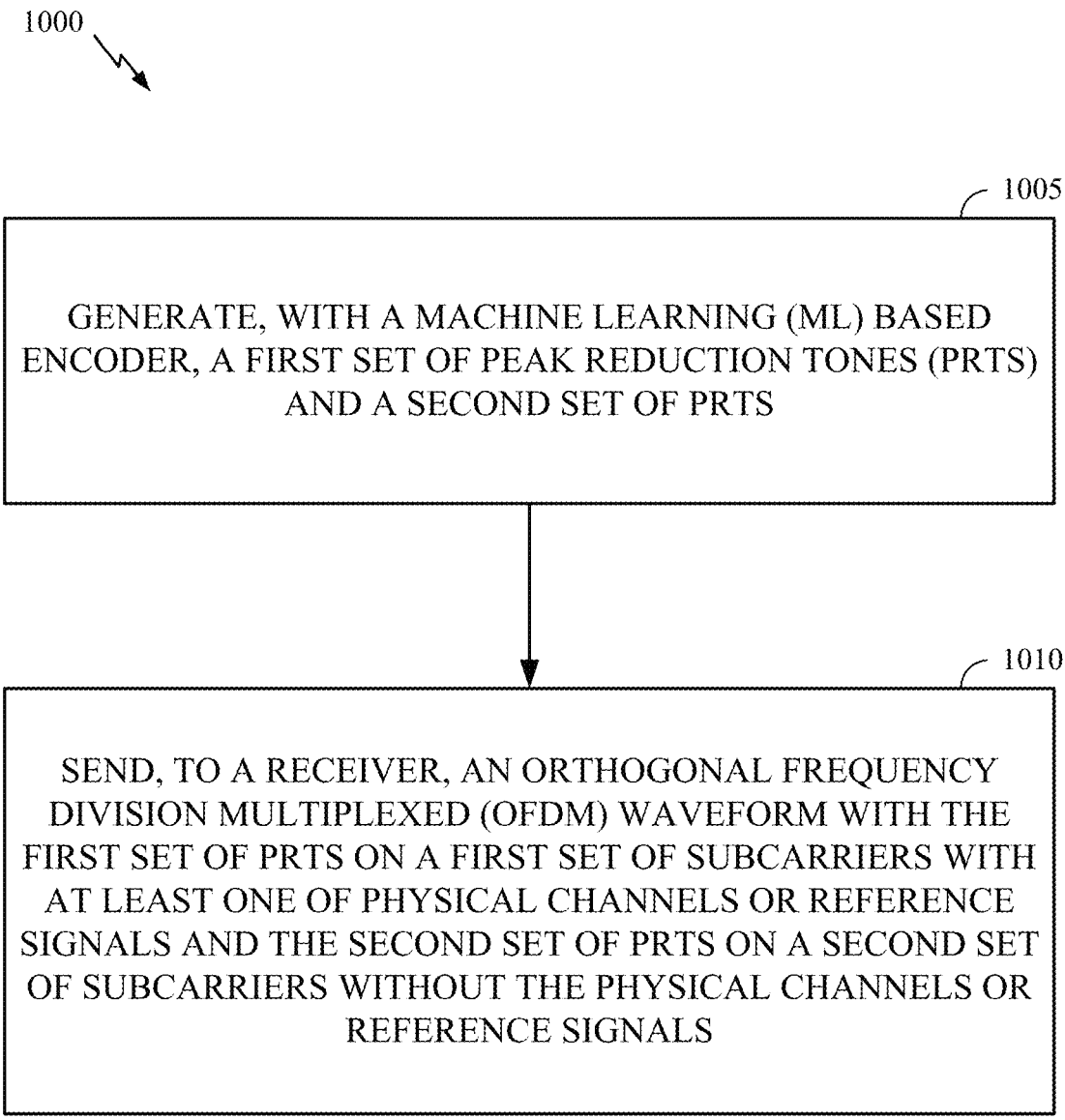
FIG. 10 illustrates example operations for wireless communication by a transmitter, in accordance with certain aspects of the present disclosure.

FIG. 10 illustrates example operations 1000 for generating, by a transmitter, an OFDM signal using an ML-based encoder. Operations 1000 begin, at 1002, by generating, with an ML-based encoder, a first set of PRTs and a second set of PRTs. At 1004, the transmitter sends, to a receiver, an orthogonal frequency division multiplexed (OFDM) waveform with the first set of PRTs on a first set of subcarriers with at least one of physical channels or reference signals and the second set of PRTs on a second set of subcarriers without the physical channels or reference signals.

Figure 11:
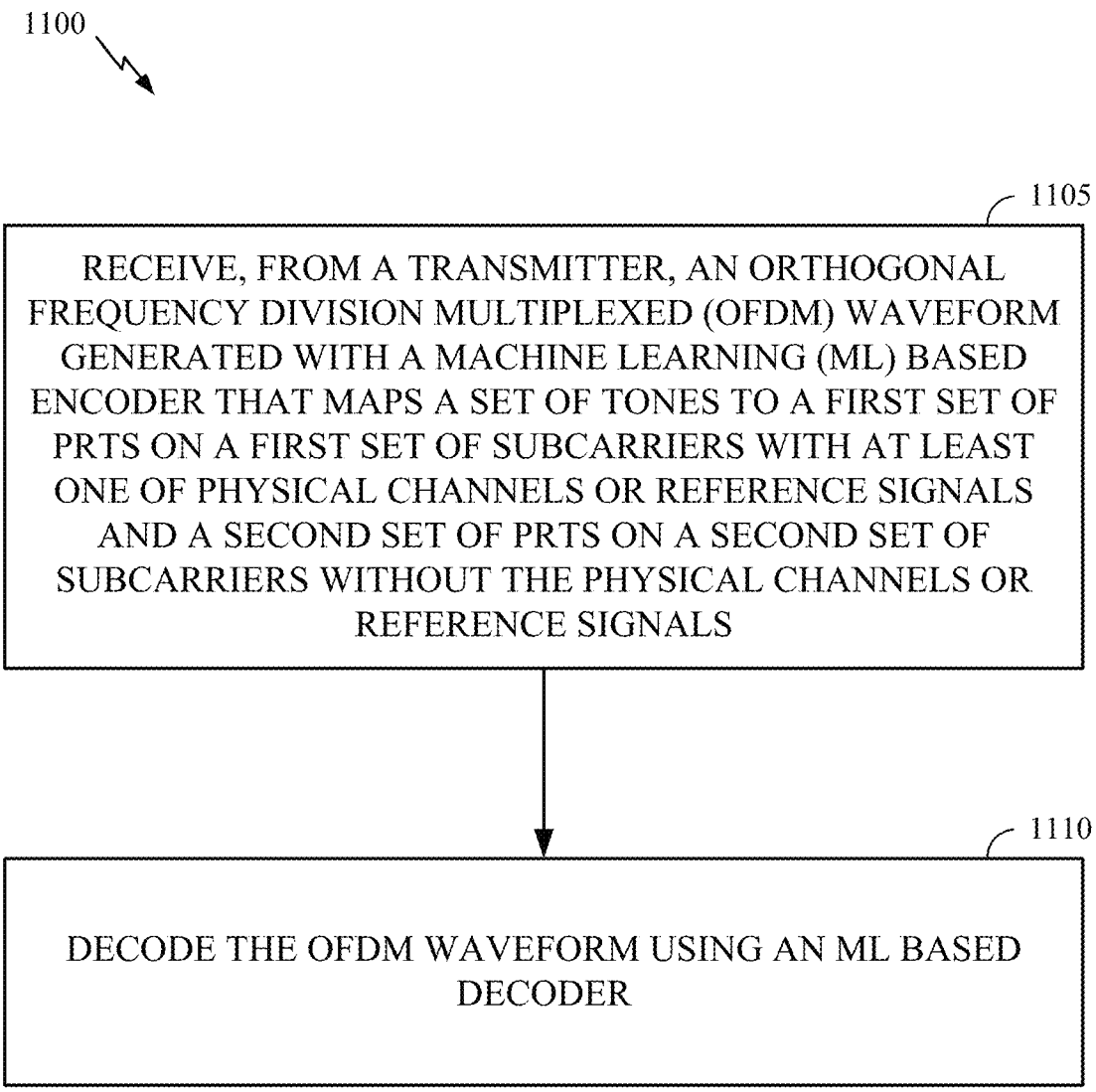
FIG. 11 illustrates example operations for wireless communication by a receiver, in accordance with certain aspects of the present disclosure.

FIG. 11 illustrates example operations 1100 for processing, by a receiver, an OFDM signal generated using an ML-based encoder. Operations 1100 begin, at 1102, receiving, from a transmitter, an orthogonal frequency division multiplexed (OFDM) waveform generated with a machine learning (ML) based encoder that maps a set of tones to a first set of PRTs on a first set of subcarriers with at least one of physical channels or reference signals and a second set of PRTs on a second set of subcarriers without the physical channels or reference signals. At 1104, the receiver decodes the OFDM waveform using an ML based decoder.

As noted above, a transmitter or receiver node may use a machine learning algorithm to learn a mapping function used to select sets of PRT tones. In some examples, the node inputs one or more parameters associated with a loss function used to evaluate a mapping function (e.g., PAPR or SINR) to such a ML algorithm.

In some examples, ML involves training a model, such as a predictive model or a neural network. The model may be used to map tones of a tone vector x to different sets of PRT tones (e.g., PRT1 and PRT2) to be sent on data tones and other (e.g., orthogonal) tones. The selection may be based on factors discussed above and/or other factors. The model may be trained based on the loss function. For example, the training may involve feeding the model the input vector x and evaluating the loss function on the output, where the loss function may measure performance metrics, such as PAPR and/or SINR for different tone vectors (e.g., associated with different operating bandwidths).

Figure 12:
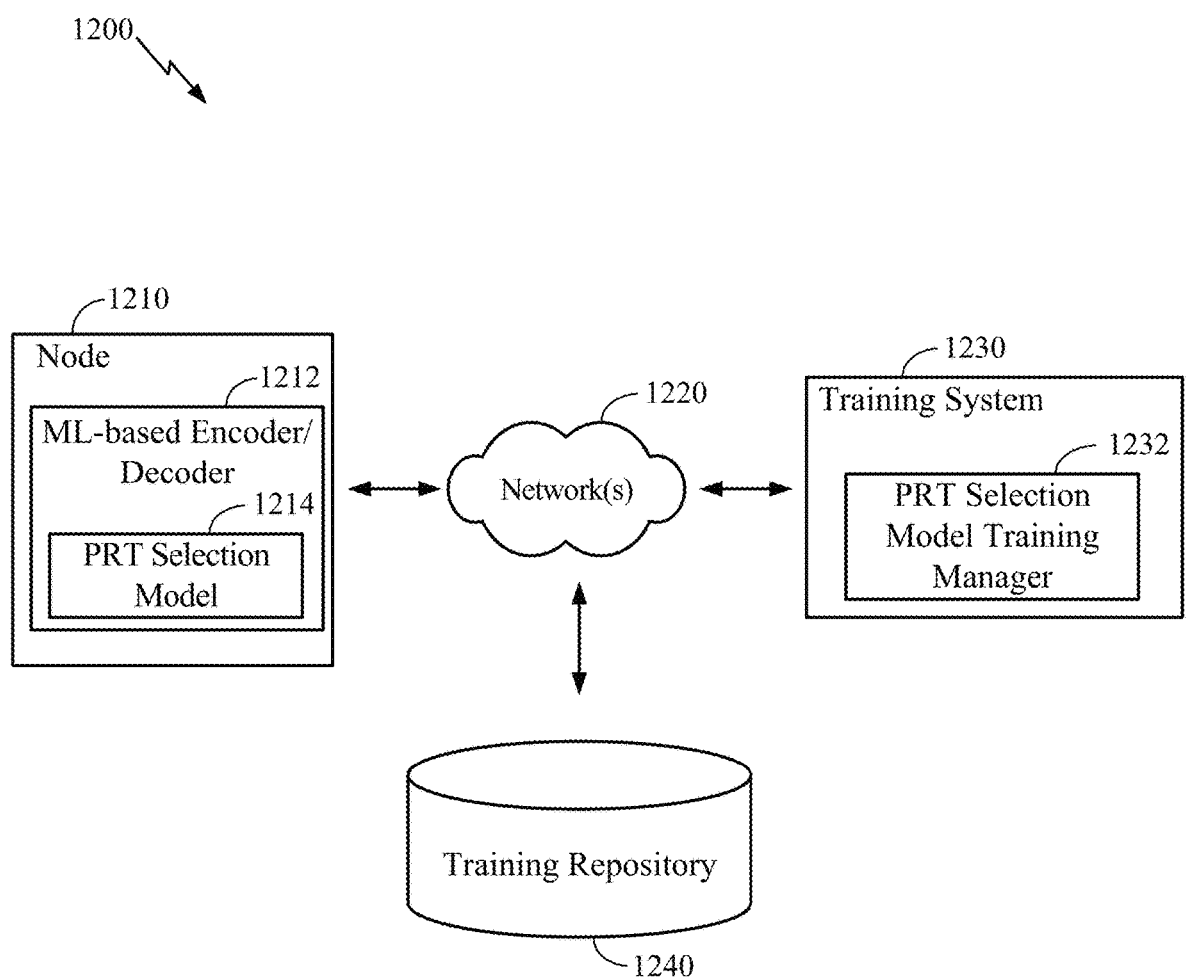
FIG. 12 illustrates an example machine learning (ML) based training system, in accordance with certain aspects of the present disclosure.

FIG. 12 illustrates an example networked environment 1200 (e.g., a training system) in which an ML-based encoder (or decoder) of a (transmitter or receiver) node 1210 uses a PRT selection model 1214 for selecting PRTs, according to certain aspects of the present disclosure. As shown in FIG. 12, networked environment 1200 includes the node 1210, a training system 1230, and a training repository 1240, communicatively connected via network(s) 1220. The node 1210 may be a UE (e.g., such as the UE 120a in the wireless communication network 100) or a BS (e.g., such as the BS 110a in the wireless communication network 100). The network(s) 1220 may include a wireless network such as the wireless communication network 100 of FIG. 1, which may be a 5G NR network, a Wi-Fi network, an LTE network, and/or another type of network. While the training system 1230, node 1210, and training repository 1240 are illustrated as separate components in FIG. 12, the environment 1200, node 1210, and training repository 1240 may be implemented on any number of computing systems, either as one or more standalone systems or in a distributed environment.

The training system 1230 generally includes a PRT selection model training manager 1232 that uses training data to generate (parameters/weights for) the PRT selection model 1214 for selecting PRTs. The PRT selection model 1214 may be determined based, at least in part, on the information in the training repository 1240.

The training repository 1240 may include training data obtained before and/or after deployment of the node 1210. The node 1210 may be trained in a simulated communication environment (e.g., using a propagation channel model typically used in the computer simulation) prior to deployment of the node 1210. For example, various data tone information for various tone maps and candidate PRT locations can be stored to obtain training information related to estimates, predictions, etc.

This information can be stored in the training repository 1240. After deployment, the training repository 1240 can be updated to include the latest nonlinearity model associated with the radio frequency (RF) distortion in the transmitter by the node 1210. The training repository 1240 can also be updated with information from other BSs and/or other UEs, for example, based on learned experience by those BSs and UEs, which may be associated with PRT selection and performance observed by those BSs and/or UEs.

The PRT selection model training manager 1232 may use the information in the training repository 1240 to determine the PRT selection model 1214 (e.g., an algorithm/mapping function). The PRT selection model training manager 1232 may use various different types of machine learning algorithms to form the PRT selection model 1214. The training system 1230 may be located on the node 1210, on a BS in the network 1220, or on a different entity that determines the PRT selection model 1214. If located on a different entity, then the PRT selection model 1214 (e.g., encoder/decoder NN parameter/weights) is provided to the node 1210. The training repository 1240 may be a storage device, such as a memory. The training repository 1240 may be located on the node 1210, the training system 1230, or another entity in the network 1220. The training repository 1240 may be in cloud storage. The training repository 1240 may receive training information from the node 1210, entities in the network 1220 (e.g., BSs or UEs in the network 1220), the cloud, or other sources.

The machine learning may use any appropriate machine learning algorithm. In some examples, the machine learning algorithm is a supervised learning algorithm, unsupervised learning algorithm, a reinforcement learning algorithm, a deep learning algorithm, an artificial neural network algorithm, or any other suitable type of machine learning algorithm.

In some examples, the machine learning (e.g., used by the training system 1230) is performed using a deep convolutional network (DCN). DCNs are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods. DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

In some examples, the machine learning (e.g., used by the training system 1230 of FIG. 12) is performed using a neural network. Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

An artificial neural network, which may be composed of an interconnected group of artificial neurons (e.g., neuron models), is a computational device or represents a method performed by a computational device. These neural networks may be used for various applications and/or devices, such as Internet Protocol (IP) cameras, Internet of Things (IoT) devices, autonomous vehicles, and/or service robots. Individual nodes in the artificial neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation." The weight values may initially be determined by an iterative flow of training data through the network (e.g., weight values are established during a training phase in which the network learns how to identify particular classes by their typical input data characteristics).

Different types of artificial neural networks can be used to implement machine learning (e.g., used by the training system 1230), such as recurrent neural networks (RNNs), multilayer perceptron (MLP) neural networks, convolutional neural networks (CNNs), and the like. RNNs work on the principle of saving the output of a layer and feeding this output back to the input to help in predicting an outcome of the layer. In MLP neural networks, data may be fed into an input layer, and one or more hidden layers provide levels of abstraction to the data. Predictions may then be made on an output layer based on the abstracted data. MLPs may be particularly suitable for classification prediction problems where inputs are assigned a class or label. Convolutional neural networks (CNNs) are a type of feed-forward artificial neural network. Convolutional neural networks may include collections of artificial neurons that each has a receptive field (e.g., a spatially localized region of an input space) and that collectively tile an input space. Convolutional neural networks have numerous applications. In particular, CNNs have broadly been used in the area of pattern recognition and classification. In layered neural network architectures, the output of a first layer of artificial neurons becomes an input to a second layer of artificial neurons, the output of a second layer of artificial neurons becomes an input to a third layer of artificial neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation.

Figure 13:
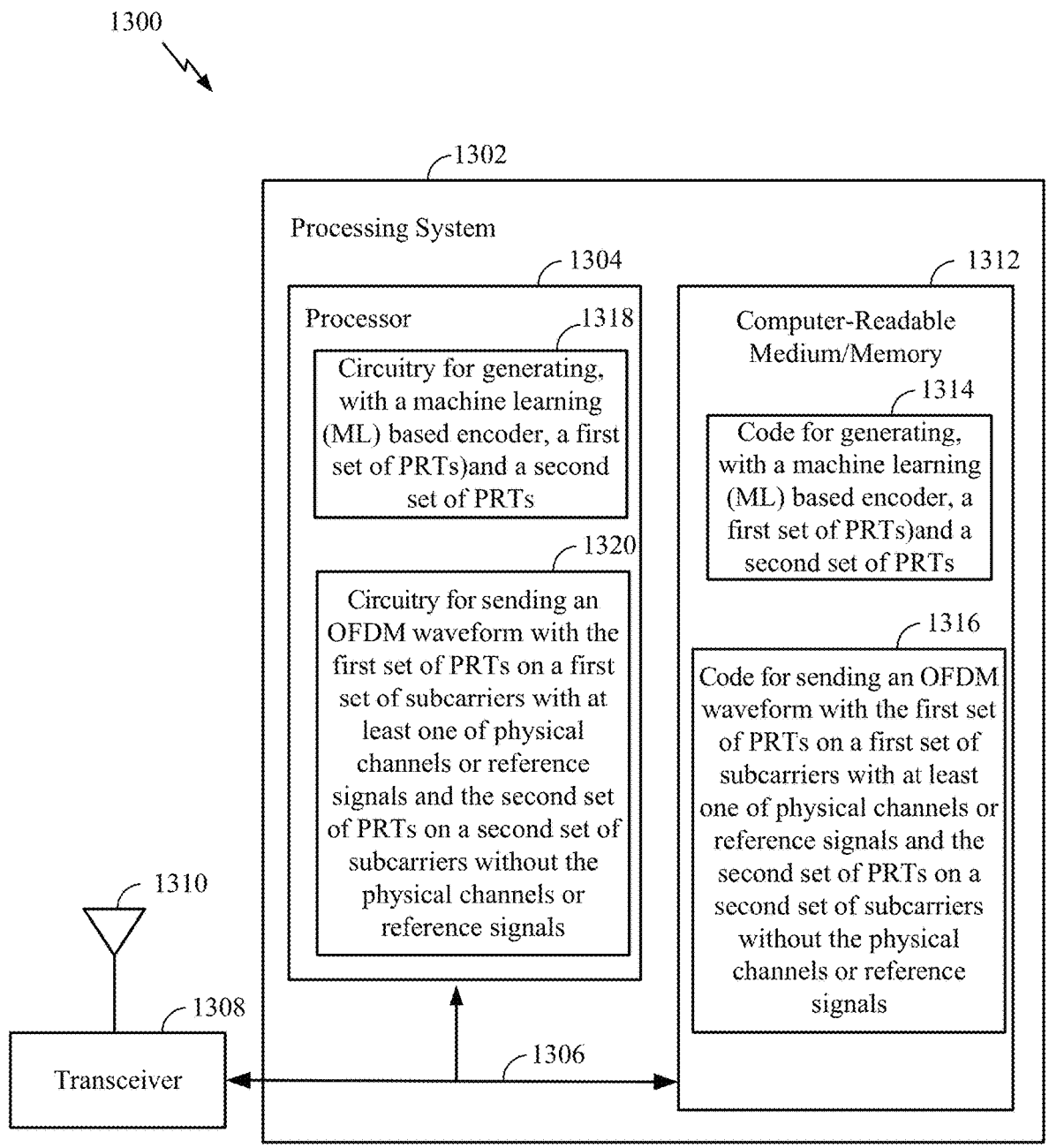
FIG. 13 illustrates a communications device that may include various components configured to perform operations for the techniques disclosed herein, in accordance with aspects of the present disclosure.

FIG. 13 illustrates a communications device 1300 (e.g., a transmitter such as a UE) that may include various components (e.g., corresponding to means-plus-function components) configured to perform operations for the techniques disclosed herein, such as the operations illustrated in FIG. 7 and/or FIG. 10. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 7 and/or FIG. 10, or other operations for performing the various techniques discussed herein. In certain aspects, computer-readable medium/memory 1312 stores code 1314 for generating, with a ML based encoder, a first set of PRTs and a second set of PRTs; and code 1316 for sending an OFDM waveform with the first set of PRTs on a first set of subcarriers with at least one of physical channels or reference signals and the second set of PRTs on a second set of subcarriers without the physical channels or reference signals. In certain aspects, the processor 1304 has circuitry configured to implement the code stored in the computer-readable medium/memory 1312. The processor 1304 includes circuitry 1318 for generating, with a ML based encoder, a first set of PRTs and a second set of PRTs; and circuitry 1320 for sending an OFDM waveform with the first set of PRTs on a first set of subcarriers with at least one of physical channels or reference signals and the second set of PRTs on a second set of subcarriers without the physical channels or reference signals.

Figure 14:
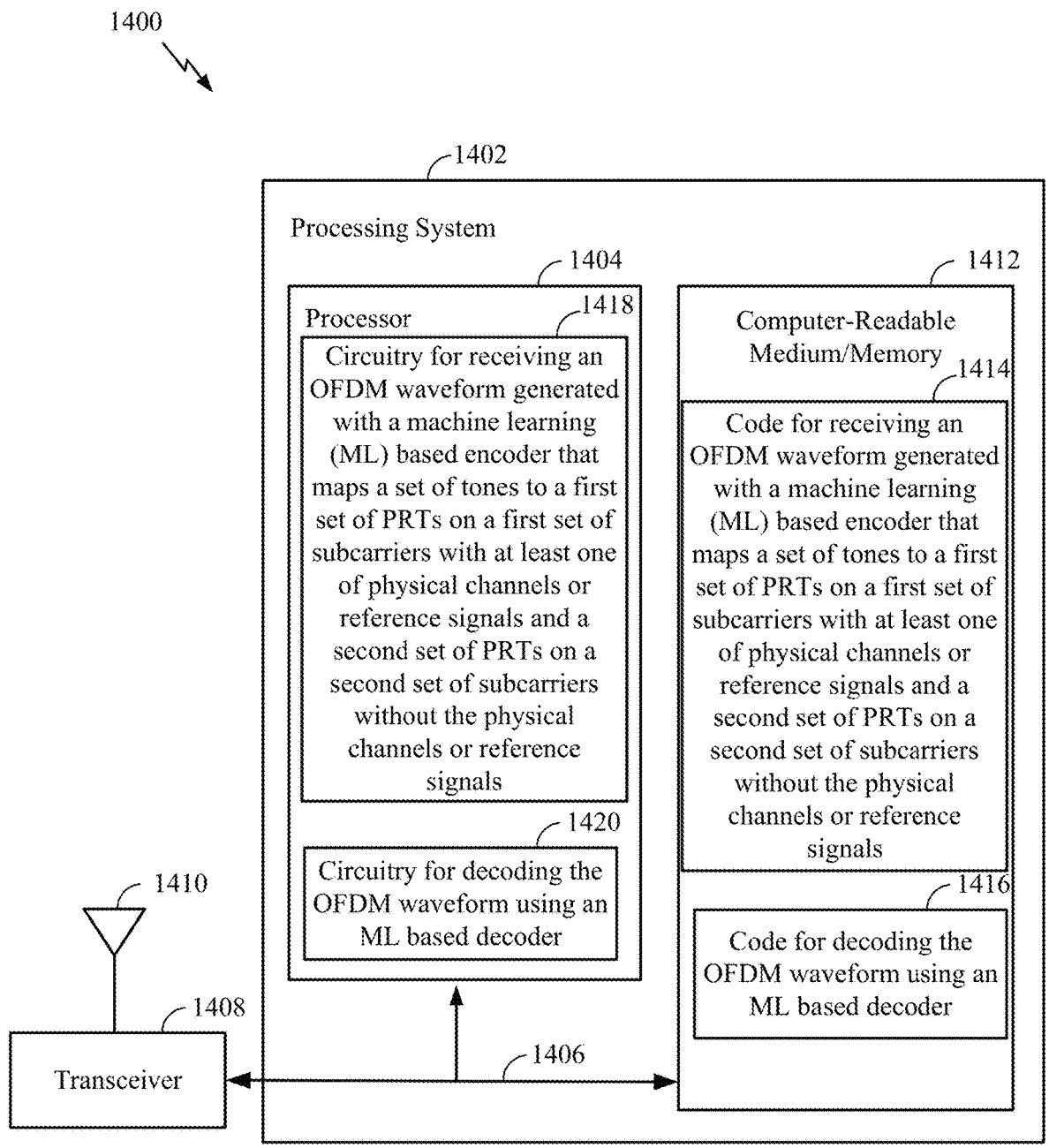
FIG. 14 illustrates a communications device that may include various components configured to perform operations for the techniques disclosed herein, in accordance with aspects of the present disclosure.

FIG. 14 illustrates a communications device 1400 (e.g., a receiver such as a gNB) that may include various components (e.g., corresponding to means-plus-function components) configured to perform operations for the techniques disclosed herein, such as the operations illustrated in FIG. 8 and/or FIG. 11. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 8 and/or FIG. 11, or other operations for performing the various techniques discussed herein. In certain aspects, computer-readable medium/memory 1412 stores code 1414 for receiving an OFDM waveform generated with a ML based encoder that maps a set of tones to a first set of PRTs on a first set of subcarriers with at least one of physical channels or reference signals and a second set of PRTs on a second set of subcarriers without the physical channels or reference signals; and code 1416 for decoding the OFDM waveform using a ML based decoder. In certain aspects, the processor 1404 has circuitry configured to implement the code stored in the computer-readable medium/memory 1412. The processor 1404 includes circuitry 1418 for receiving an OFDM waveform generated with a ML based encoder that maps a set of tones to a first set of PRTs on a first set of subcarriers with at least one of physical channels or reference signals and a second set of PRTs on a second set of subcarriers without the physical channels or reference signals; and circuitry 1420 for decoding the OFDM waveform using a ML based decoder.

Example Aspects

Aspect 1: A method for wireless communications by a transmitter, comprising generating, with a machine learning (ML) based encoder, a first set of peak reduction tones (PRTs) and a second set of PRTs, and sending, to a receiver, an orthogonal frequency division multiplexed (OFDM) waveform with the first set of PRTs on a first set of subcarriers with at least one of physical channels or reference signals and the second set of PRTs on a second set of subcarriers without the physical channels or reference signals.

Aspect 2: The method of Aspect 1, wherein the first and second sets of PRTs are generated per OFDM symbol.

Aspect 3: The method of Aspect 1 or 2, wherein the physical channels comprise one or more uplink physical channels.

Aspect 4: The method of any of Aspects 1-3, wherein the reference signals comprise one or more uplink reference signals.

Aspect 5: The method of any of Aspects 1-4, further comprising training the ML based encoder to learn a function that maps a vector of tones to the first and second sets of PRTs, generating information regarding a ML based decoder corresponding to the ML based encoder, and signaling information regarding the ML based decoder to the receiver for use in decoding.

Aspect 6: The method of Aspect 5, wherein the information comprises weights for the ML based decoder.

Aspect 7: The method of Aspect 5 or 6, wherein the ML based encoder comprises an encoder neural network, and the ML based decoder comprises a decoder neural network.

Aspect 8: The method of any of Aspects 1-7, further comprising receiving, from the receiver, information regarding the ML based encoder.

Aspect 9: The method of Aspect 8, wherein the information comprises weights for the ML based encoder.

Aspect 10: A method for wireless communications by a receiver, comprising receiving, from a transmitter, an OFDM waveform generated with a ML based encoder that maps a set of tones to a first set of PRTs on a first set of subcarriers with at least one of physical channels or reference signals and a second set of PRTs on a second set of subcarriers without the physical channels or reference signals, and decoding the OFDM waveform using a ML based decoder.

Aspect 11: The method of Aspect 10, wherein the first and second sets of PRTs are generated by the ML based encoder per OFDM symbol.

Aspect 12: The method of Aspect 10 or 11, wherein the physical channels comprise one or more uplink physical channels.

Aspect 13: The method of any of Aspects 10-12, wherein the reference signals comprise one or more uplink reference signals.

Aspect 14: The method of any of Aspects 10-13, further comprising receiving information regarding the ML based decoder from the transmitter.

Aspect 15: The method of Aspect 14, wherein the information comprises weights for the ML based decoder.

Aspect 16: The method of any of Aspects 10-15, further comprising training the ML based encoder to learn a function that maps a vector of tones to the first and second sets of PRTs, and transmitting, to the transmitter, information regarding the ML based encoder.

Aspect 17: The method of Aspect 16, wherein the information comprises weights for the ML based encoder.

Aspect 18: The method of any of Aspects 10-17, wherein the ML based encoder comprises an encoder neural network, and the ML based decoder comprises a decoder neural network.

Aspect 19: An apparatus for wireless communication, comprising a memory and a processor coupled to the memory, the processor and memory configured to perform one or more of the methods of Aspects 1-18.

Aspect 20: An apparatus for wireless communication, comprising various means for performing one or more of the methods of Aspects 1-18.

Aspect 21: A non-transitory computer-readable medium that comprises instructions that when executed by a wireless device, cause the wireless device to perform one or more of the methods of Aspects 1-18.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software.

Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 7, 8, 10, and/or 11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communication by a transmitter, comprising:
 a memory comprising computer executable instructions thereon; and
 a processor coupled to the memory, the processor and memory configured to execute the computer executable instruction and cause the apparatus to:
  generate, with a machine learning (ML) based encoder, a first set of peak reduction tones (PRTs) and a second set of PRTs; and
  send, to a receiver, an orthogonal frequency division multiplexed (OFDM) waveform with the first set of PRTs on a first set of subcarriers with at least one of physical channels or reference signals and the second set of PRTs on a second set of subcarriers without the physical channels or reference signals.

2. The apparatus of claim 1, wherein the first and second sets of PRTs are generated per OFDM symbol.

3. The apparatus of claim 1, wherein the physical channels comprise one or more uplink physical channels.

4. The apparatus of claim 1, wherein the reference signals comprise one or more uplink reference signals.

5. The apparatus of claim 1, wherein the processor and memory are configured to execute the computer executable instruction and cause the apparatus to:
 train the ML based encoder to learn a function that maps a vector of tones to the first and second sets of PRTs;
 generate information regarding a ML based decoder corresponding to the ML based encoder; and
 signal information regarding the ML based decoder to the receiver for use in decoding.

6. The apparatus of claim 5, wherein the information comprises weights for the ML based decoder.

7. The apparatus of claim 5, wherein:
 the ML based encoder comprises an encoder neural network; and
 the ML based decoder comprises a decoder neural network.

8. The apparatus of claim 1, wherein the processor and memory are configured to execute the computer executable instruction and cause the apparatus to receive, from the receiver, information regarding the ML based encoder.

9. The apparatus of claim 8, wherein the information comprises weights for the ML based encoder.

10. The apparatus of claim 9, wherein the processor and memory are configured to execute the computer executable instructions and cause the apparatus to:
 determine, based on the information, a function that maps a set of data tones to PRTs.

11. The apparatus of claim 1, wherein the processor and memory are configured to execute the computer executable instructions and cause the apparatus to:
 determine a function that maps a set of data tones to PRTs; and
 generate, with the ML based encoder, the first set of PRTs and the second set of PRTs based on the function and the set of data tones.

12. The apparatus of claim 11, wherein the processor and memory are configured to execute the computer executable instructions and cause the apparatus to:
 receive the function from the receiver.

13. The apparatus of claim 1, wherein the processor and memory are configured to execute the computer executable instructions and cause the apparatus to:
 train the ML based encoder to learn a function that maps a vector of tones to the first set of PRTs and the second set of PRTs; and
 generate information regarding a ML based decoder corresponding to the ML based encoder.

14. The apparatus of claim 1, wherein the processor and memory are configured to execute the computer executable instructions and cause the apparatus to:
 signal information regarding an ML based decoder to the receiver for use in decoding.

15. The apparatus of claim 14, wherein the information comprises a function that maps a set of data tones to PRTs.

16. The apparatus of claim 14, wherein the information comprises weights for the ML based decoder.

17. An apparatus for wireless communication by a receiver, comprising:
 a memory comprising computer executable instructions thereon; and
 a processor coupled to the memory, the processor and memory configured to execute the computer executable instruction and cause the apparatus to:
  receive, from a transmitter, an orthogonal frequency division multiplexed (OFDM) waveform generated with a machine learning (ML) based encoder that maps a set of tones to a first set of peak reduction tones (PRTs) on a first set of subcarriers with at least one of physical channels or reference signals and a second set of PRTs on a second set of subcarriers without the physical channels or reference signals; and decode the OFDM waveform using a ML based decoder.

18. The apparatus of claim 17, wherein the first and second sets of PRTs are generated by the ML based encoder per OFDM symbol.

19. The apparatus of claim 17, wherein the physical channels comprise one or more uplink physical channels.

20. The apparatus of claim 17, wherein the reference signals comprise one or more uplink reference signals.

21. The apparatus of claim 17, wherein the processor and memory are configured to execute the computer executable instruction and cause the apparatus to receive information regarding the ML based decoder from the transmitter.

22. The apparatus of claim 21, wherein the information comprises weights for the ML based decoder.

23. The apparatus of claim 17, wherein the processor and memory are configured to execute the computer executable instruction and cause the apparatus to train the ML based encoder to learn a function that maps a vector of tones to the first and second sets of PRTs; and transmit, to the transmitter, information regarding the ML based encoder.

24. The apparatus of claim 23, wherein the information comprises weights for the ML based encoder.

25. The apparatus of claim 23, wherein:

the ML based encoder comprises an encoder neural network; and the ML based decoder comprises a decoder neural network.

26. A method for wireless communication by a transmitter, comprising:

generating, with a machine learning (ML) based encoder, a first set of peak reduction tones (PRTs) and a second set of PRTs; and sending, to a receiver, an orthogonal frequency division multiplexed (OFDM) waveform with the first set of PRTs on a first set of subcarriers with at least one of physical channels or reference signals and the second set of PRTs on a second set of subcarriers without the physical channels or reference signals.

27. The method of claim 26, wherein the first and second sets of PRTs are generated per OFDM symbol.

28. The method of claim 26, wherein the physical channels comprise one or more uplink physical channels.

29. The method of claim 26, wherein the reference signals comprise one or more uplink reference signals.

30. The method of claim 26, further comprising:

training the ML based encoder to learn a function that maps a vector of tones to the first and second sets of PRTs;

generating information regarding a ML based decoder corresponding to the ML based encoder; and signaling information regarding the ML based decoder to the receiver for use in decoding.

31. The method of claim 30, wherein the information comprises weights for the ML based decoder.

32. The method of claim 30, wherein:

the ML based encoder comprises an encoder neural network; and the ML based decoder comprises a decoder neural network.

33. The method of claim 26, further comprising receiving, from the receiver, information regarding the ML based encoder.

34. The method of claim 33, wherein the information comprises weights for the ML based encoder.

35. A method for wireless communication by a receiver, comprising:

receiving, from a transmitter, an orthogonal frequency division multiplexed (OFDM) waveform generated with a machine learning (ML) based encoder that maps a set of tones to a first set of peak reduction tones (PRTs) on a first set of subcarriers with at least one of physical channels or reference signals and a second set of PRTs on a second set of subcarriers without the physical channels or reference signals; and decoding the OFDM waveform using a ML based decoder.

36. The method of claim 35, further comprising:

training the ML based encoder to learn a function that maps a vector of tones to the first and second sets of PRTs;

generating information regarding a ML based decoder corresponding to the ML based encoder; and signaling information regarding the ML based decoder to the receiver for use in decoding.

37. The method of claim 35, wherein:

the ML based encoder comprises an encoder neural network; and the ML based decoder comprises a decoder neural network.

* * * * *